United States Patent [19]

Hrabal

[11] Patent Number: 4,924,906
[45] Date of Patent: May 15, 1990

[54] RING VALVE

[75] Inventor: Hans Hrabal, Vienna, Austria

[73] Assignee: Hoerbiger Ventilwerke Aktiengesellschaf, Austria

[21] Appl. No.: 357,884

[22] Filed: May 25, 1989

[30] Foreign Application Priority Data

May 31, 1988 [AT] Austria ................. 1424/88
Jul. 22, 1988 [AT] Austria ................. 1874/88

[51] Int. Cl.⁵ ............................................. F16K 15/08
[52] U.S. Cl. ........................... 137/512.1; 137/516.15; 137/516.17; 137/516.23
[58] Field of Search .......... 137/512.1, 512.15, 516.11, 137/516.13, 516.15, 516.17, 516.19, 516.21, 516.23

[56] References Cited

U.S. PATENT DOCUMENTS

| 767,118 | 8/1904 | Popham et al. | 137/516.23 X |
| 867,299 | 10/1907 | Pfluger | 137/516.21 |
| 1,690,836 | 11/1928 | Redfield | 137/516.19 |
| 2,275,627 | 3/1942 | Hartman | 137/516.19 X |
| 2,870,783 | 1/1959 | Kehler | 137/516.13 |
| 3,123,095 | 3/1964 | Kohler | 137/516.23 |
| 3,536,094 | 10/1970 | Manley, Jr. | 137/512.1 |
| 4,016,906 | 4/1977 | Ulm | 137/516.21 |
| 4,483,363 | 11/1984 | Madoche et al. | 137/516.15 X |

FOREIGN PATENT DOCUMENTS 815186 6/1959 United Kingdom ........... 137/516.15

*Primary Examiner*—John Rivell
*Attorney, Agent, or Firm*—Watson, Cole, Grindle & Watson

[57] ABSTRACT

The valve plate (6) which is spring-loaded against the valve seat (2) of the ring valve comprises individual annular plates (10) disposed over the passage channels (1) of the valve seat, plus a support plate (11) which lies jointly on all the annular plates (10) on that side thereof facing away from the valve seat (2) and transfers the force of the spring elements (18) which act on it. The annular plates (10) can be bevelled both on the sides facing the valve seat (2) and on the sides facing away from the valve seat (2). With their bevelled side facing the valve seat (2) they engage in funnel-shaped enlargements in the valve seat (2) and cooperate with sealing seats (17).

18 Claims, 5 Drawing Sheets

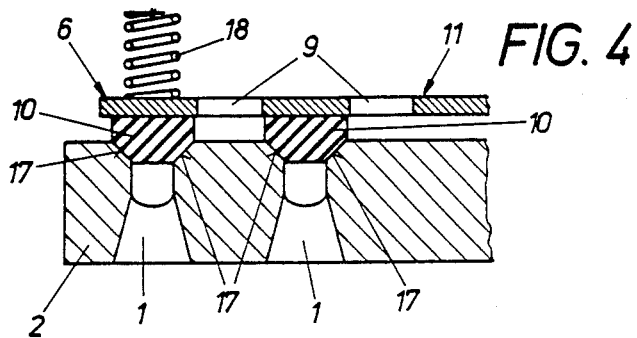
FIG. 4
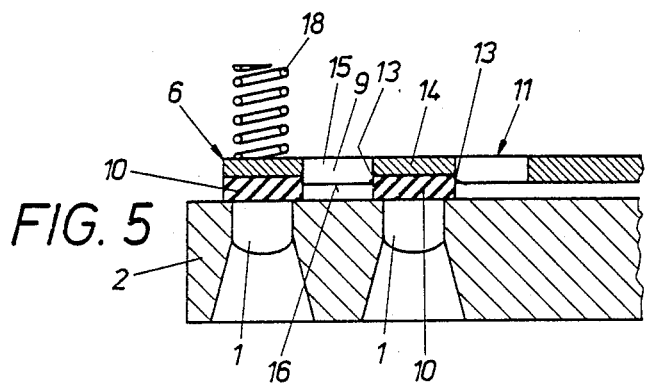
FIG. 5
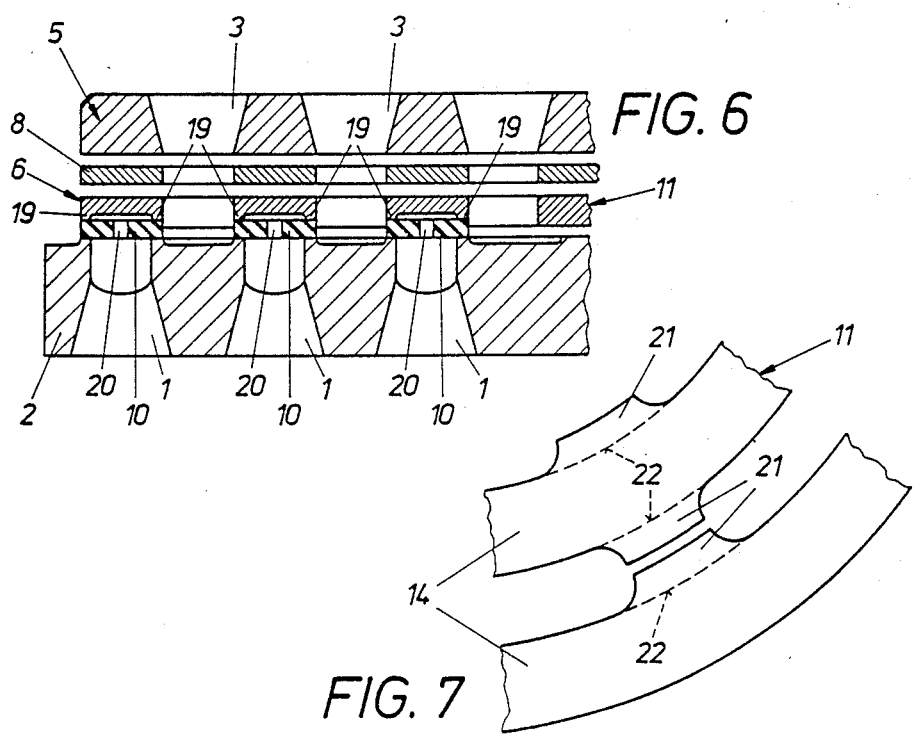
FIG. 6
FIG. 7

RING VALVE

SUMMARY OF THE INVENTION

The invention relates to a ring valve, particularly for compressors, comprising a valve seat with passage channels disposed in ring formation for the controlled medium, a valve guard comprising outlet passages and arranged above the valve seat to leave an interspace therebetween, and a valve plate disposed in this interspace and urged against the valve seat by spring elements supported on the valve guard.

Valves of this type are known in the most varied forms and are used in particular in compressors to automatically control the load alternation. For this purpose the valve plate must cooperate reliably with the passage channel openings in order to satisfactorily fulfil its inherent sealing function on that surface thereof which faces the valve seat. In addition, an attempt must be made to obtain the most uniform possible distribution of the prestressing force, which is mostly applied by individual spring elements. In this respect, problems often arise during valve construction in the sense that a satisfactory compromise between stiffness aimed at improving the distribution of the prestressing force and softness or elasticity aimed at improving the inherent sealing effect is relatively difficult to attain.

The object of the invention is to so improve a ring valve of this type as to obviate the drawbacks of comparable known valve constructions, and in particular to ensure satisfactory operation in the sense of trouble-free sealing and spring loading, using the simplest possible means.

This object is attained according to the invention in that the valve plate consists of individual annular plates disposed over the passage channels of the valve seat, plus a support plate which lies jointly on all the annular plates on that side thereof facing away from the valve seat and transferring the force of the spring elements which act on it. The essential functions of the valve plate are by this means divided between the support plate and the individual annular plates, so that these two elements can be correspondingly optimized in terms of the functions which they perform. The individual annular plates, which can be constructed with sufficient softness or resilience and elasticity in order to ensure tight cooperation with the associated counter-surfaces on the valve seat, serve in particular for the reliable sealing of the passage channels of the valve seat, whereas the support plate, which can be constructed rigid, serves for uniform application and distribution of the spring forces.

The construction of individual separated concentrically disposed annular plates is already known in the case of ring valves. For example, U.S. Pat. No. 3,536,094 describes a ring valve for compressors in which the passage channels in the valve seat are controlled by individual annular plates. These annular plates are arranged independently of each other and are each provided with its own closure springs. The annular plates are formed with a circular arc profile on that side facing the valve seat, and project into a funnel-shaped enlargement of the associated passage channel, by which the annular plates are guided in a radial direction. However, a drawback is that each individual annular plate must have its own spring means provided and each annular plate must be stable overall and be of such a shape as to be able to accept and transfer the spring forces. There is thus no separation of the said two essential functions of the valve plate, so that the said drawbacks, which are overcome by the present invention, cannot be avoided.

According to a further embodiment of the invention, the support plate is centered in the valve and is guided during its lifting movement. This guiding, as in the case of valve plates, can be of sliding or articulated type, so that both lubricated and unlubricated valve operation is possible. At this point it should be noted that the ring valve according to the invention can be fitted with any available spring system such as resilient plates or helical springs, and can also be provided with double damping.

According to a further advantageous embodiment of the invention, the support plate can be locked in position in relation to the valve seat and valve guard in an axial direction in the region of the valve axis and/or its outer periphery, and by corresponding profiling and/or choice of material can also directly form the spring elements. By this means use is again advantageously made of the separation of the two essential valve plate functions according to the invention—the means required at the support plate for the one-piece construction of the spring elements in no way impair the actual sealing function performed by the annular plates.

According to a further embodiment of the invention the support plate can be secured to the individual annular plates so that they are immobile in a radial direction. In itself, under certain circumstances such as in the case of conical sealing surfaces and small lifts, radial guiding or centering of the individual annular plates can be superfluous. However in the normal case, guiding of the individual annular plates will advantageously be provided, and is attained in the described manner with the aid of the centering or guiding of the support plate.

According to a further embodiment of the invention, in this latter connection the support plate can be provided with centering projections, lying at least against one edge of the annular plates. These latter can then move by a certain amount in an axial direction relative to the support plate or the other annular plates and thus individually adapt to the flow conditions. The annular plates cannot fall out of their guides as these are always pressed against the support plate and thus against their guides by the flow pressure.

According to a further advantageous embodiment of the invention the support plate can be at least partially provided with groove-shaped depressions in which the annular plates are inserted. This makes it simple to form the guiding or centering for the individual annular plates relative to the support plate. With any of the stated or centering methods for the annular plates, the inner annular plates of smaller diameter can be made thinner or have the associated contacting surfaces on the support plate made deeper, by which the inner rings are able to rise earlier under the action of pressure.

According to a further advantageous embodiment of the invention, the annular plates are made unrotatable relative to the support plate, preferably by means of radial projections or the like, which engage with radially directed guide surfaces on the support plate. The described protection against the rotation of the annular plates, which for many applications is more advantageous than free rotatability of the annular plates, is simple to attain and is particularly advantageous in combination with radial guiding or centering of the annular plates.

According to a further embodiment of the invention the support plate lies tightly against the annular plates, at least in the region of the edges of these latter, the annular plates comprising perforations in the sealed region. This ensures that when the valve is in its closed state the annular plates are not stressed by the pressure difference, which then acts on the support plate by way of the perforations. Properly considered however, in this case two valve seats are produced on the two opposing surfaces of the annular plates; any danger of a double leakage in this case is however excluded because of the possibility of choosing the annular plates of correspondingly soft material.

In this latter connection, a further embodiment of the invention is advantageous according to which the support plate is provided with sealing strips which lie against the annular plates. These, in the case of a further embodiment of the invention in which the annular plates are soft and at least partially of plastics material, can improve the sealing or reduce the danger of leakage. According to the invention, when the valve is closed the support plate can lie only against some of the annular plates, for example against the most outer annular plate, a free intermediate gap being provided between the remaining annular plates and the support plate. For this purpose the annular plates can for example be made of unequal thicknesses for a constant thickness support plate, or the contact surfaces on the support plate for the individual annular plates can lie at different levels, for example be worked to different depths in the support plate. This provides the additional advantage that those annular plates against which the support plate does not directly lie when the valve is closed rise easily and quickly from the valve seat on reversal of flow direction in the reciprocating compressor, because they have practically no spring loading. However, after the valve has opened these annular plates also come into contact with the support plate, so that their opening movement is damped. In a further advantageous embodiment of the ring valve according to the invention, the annular plates associated with the common support plate are bevelled both on the sides facing the valve seat and on the sides facing away from the valve seat, and in known manner engage in matching funnel-shaped enlargements in the valve seat. By this means a particularly simple ring valve with improved operational characteristics is obtained. The fact that the annular plates are also bevelled on the upper side facing away from the valve seat means that the contact surface between the annular plates and the associated support plate is reduced, so that no disadvantageous adhesion forces occur between the annular plates and the support plate, which particularly in the case of lubricated valves or in the transportation of gases with entrained liquids can cause delayed closure of the valve with all its disadvantageous consequences. Furthermore, additional working surfaces for the medium passing through the valve are created, so that when passage ceases additional forces are exerted on the annular plates immediately at the commencement of an arising return flow, resulting in immediate closure. Troublesome late closure of the valve is thus prevented. In addition, the bevelled form of the annular plates on both sides results in a material saving and a reduction in the weight of the annular plates, this being likewise an advantage.

According to an advantageous embodiment of the invention the annular plates have the same profile on both sides. This means that the annular plates can be incorporated into the valve either way, so that initially on valve assembly it is not necessary to take account of any particular fitting position, and later when wear appears the annular plates can be turned over so making them usable for a correspondingly longer time.

According to a further embodiment of the invention the annular plates can be formed with a polygonal cross-section. In such a case a regular cross-sectional profile is preferred, which is relatively simple to form. It is desirable to round the edges of the polygonal cross-section, as this reduces the danger of twisting and improves the flow conditions along the annular plates.

Finally, according to a particularly simple embodiment of the invention the annular plates are of torus shape. Such a ring shape with a circular cross-sectional profile involves little production cost. Nevertheless the common support plate provides a uniform transmission of the spring forces onto the annular plates and a reliable guiding of these latter during during lift movement. The cross-sectional profile of the annular plates can however be variously curved, for example it can be of elliptical or pea shape. Furthermore, a rectangular profile convex or rounded off on both sides can be provided.

Advantageously, the annular plates according to the invention can be constructed of a non-metal material, and in particular plastics. They are particularly suitable for this by virtue of their cross-sectional profile.

The drawings diagrammatically illustrate various embodiments of the invention.

FIGS. 4 and 5 are further embodiments of the invention in a view corresponding to FIG. 3;

FIG. 6 shows a further embodiment of the invention in a cross-sectional view corresponding to FIG. 1;

FIG. 7 is a partial plan view of a support plate of a further embodiment of the invention;

FIGS. 12 to 15 each show a partial cross-section through various embodiments of the invention.

Figure 1:
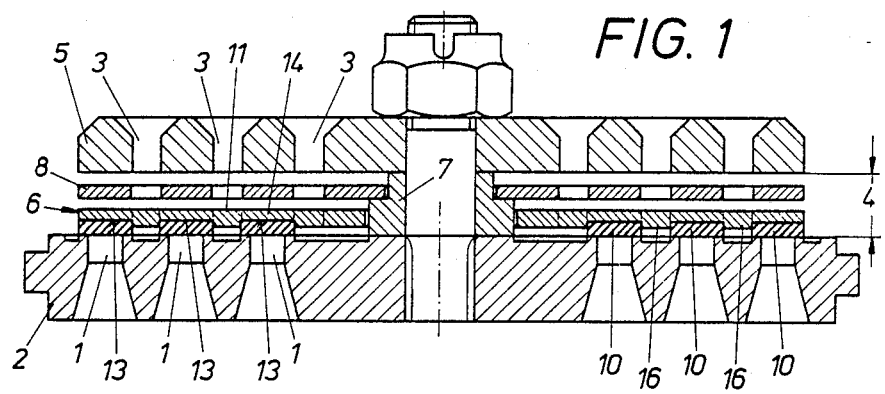
FIG. 1 is a partial cross-section through a ring valve formed in accordance with the invention.

The ring valve of FIG. 1 comprises a valve seat 2 provided with annularly disposed passage channels 1 for the controlled medium, a valve guard 5 provided with discharge channels 3 and fitted above the valve seat in such a manner as to leave an interspace 4 therebetween, and a valve plate 6 disposed in this interspace 4 and in this case damped by means of a damping plate 8 supported on the guard by way of a centering appendix 7 and spring-loaded in a manner not illustrated. In the illustrated representation the ring valve is shown closed—as soon as a pressure acts on the side comprising the passage channels 1 which is sufficient to overcome the prestressing force exerted on the valve plate 6 by means of spring elements, the valve plate 6 rises away from the valve seat 2 so that the medium to be controlled can flow from the passage channels 1 to the discharge channels 3 via the openings 9 in the valve plate 6.

Figure 2:
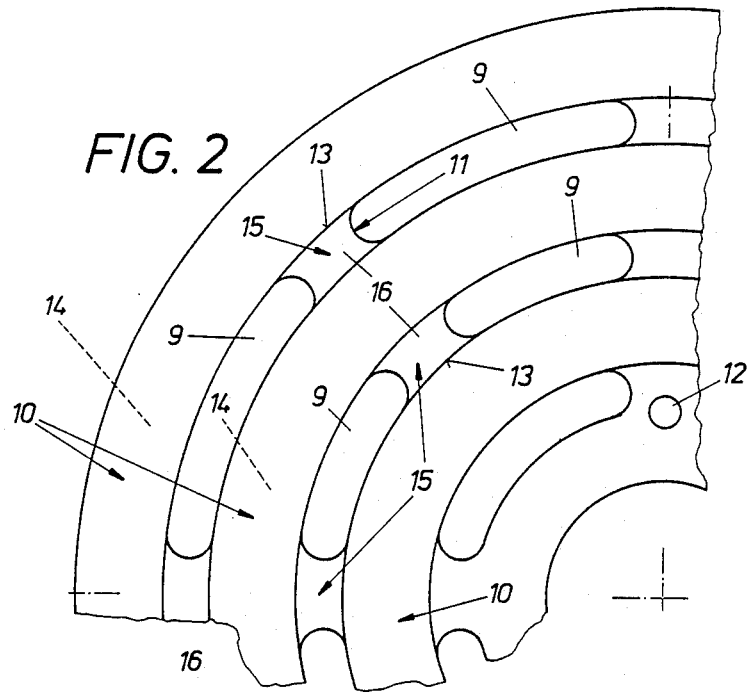
FIG. 2 is a partial view from below of the valve plate of the embodiment of FIG. 1.

The valve plate 6 comprises individual annular plates 10 disposed over the passage channels 1, and a support plate 11 which rests jointly on all annular plates 10 on that side thereof facing away from the valve seat 2 and transfers the force of the spring elements which act on it. The support plate 11 is in this case centered on the centering appendix 7 between the valve seat 2 and guard 5—rotation is prevented by a bore 12 visible in FIG. 2, which cooperates with a pin on the valve seat 2 in a manner not illustrated.

The support plate 11 can be secured to the individual annular plates 10 so that these are immovable in a radial direction. The annular plates 10, which consist for example of a suitable plastics material or of a soft material which improves the seal against the valve seat 2, can however be loosely inserted with small clearance into circular grooves 13 in the support plate 11, which consists for example of a suitable hard metal such as spring steel or the like. In the embodiment shown in FIGS. 1 and 2 the width of the individual annular plates 10 is exactly equal to the width of the overlying webs 14 remaining between the openings 9 in the support plate 11, therefore the grooves 13 are actually present only in the region of the connecting webs 15 between the openings 9, by which centering projections 16 are created and lie against the edges of the annular plates 10.

Even if—as stated—the annular plates 10 are held loosely with a small clearance in the support plate 11, they are unable to fall out as the pressure of the medium flowing from the passage channels 1 to the discharge passages 3 presses the annular plates 10 continuously against the support plate 11.

Figure 3:
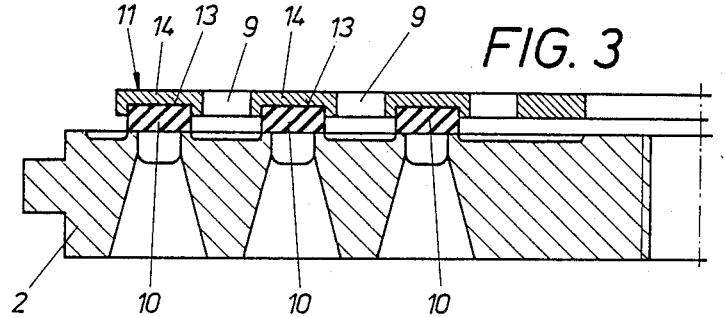
FIG. 3 is a partial cross-section through a further embodiment of the invention, showing only the valve seat and the valve plate.

In the embodiment shown in FIG. 3 the annular plates 10 have a smaller width than the overlying webs 14 of the support plate 11, so that grooves 13 are again formed in the region of the openings 9 for receiving the annular plates 10, by which means an improved retention or guiding of the annular plates 10 in the support plate 11 is obtained.

In the embodiment shown in FIG. 4, the individual annular plates 10 are totally unguided by the support plate 11 and lie only in conically shaped sealing seats 17 in the valve seat 2. The spring elements used in this case for prestressing the valve plate 6 are individual helical springs 18, the spring force of which in its turn is distributed by means of the support plate 11 uniformly over the annular plates 10 and thereby over the sealing seats 17. As in this case there is no guiding of the annular plates 10 on the support plate 11, the extent of possible lift of the annular plates 10 from the sealing seats 17 must obviously not be such as to allow the former to completely move out of the the sealing seats.

The arrangement shown in FIG. 5 again corresponds substantially to the embodiment of FIG. 1—a slight difference therefrom is that in this case the grooves 13 in the support plate 11 are wider than the webs 14, so that again only centering projections 16 arise in the region of the connection webs 15 between the openings 9 in the support plate 11, which in this case have a smaller width than the openings 9. A further difference compared with FIG. 1 is than in FIG. 5 the spring elements are shown as individual helical springs 18 as in FIG. 4.

In the embodiment shown in FIG. 6 the support plate 11 is provided with sealing strips 19 provided in the region of the edges of the annular plates 10 and sealing against these latter, the annular plates 10 comprising perforations 20 in the sealed region between the sealing strips 19. By this means the annular plates 10 are pressure-unloaded and can in all cases can be constructed of soft elastic material such as plastics even when higher pressures are to be controlled.

FIG. 7 shows a further method for guiding, centering or retaining the non-illustrated annular plates on the support plate 11. For this purpose tongues 21 are provided at suitable angular distances apart on the webs 14, and during the construction of the support plate 11 are bent outwards from the plane of the drawing along the dashed lines 22, so providing lateral guiding for the annular plates, but which in contrast to the illustration can also be provided on one side only.

Figure 8:
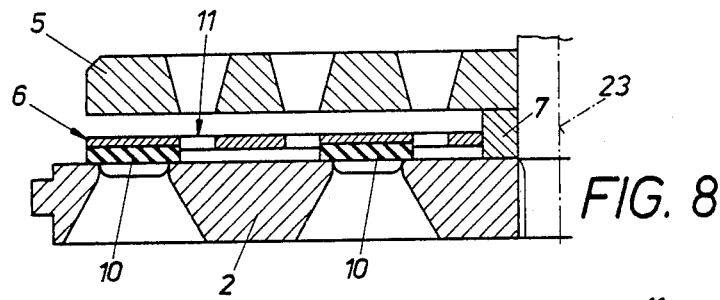
FIG. 8 is a partial cross-section through a further embodiment of the invention.

In the embodiment shown in FIG. 8 the support plate 11 is locked in position in a non-illustrated manner in relation to the valve seat 2 or the valve guard 5 in an axial direction in the region of the valve axis 23 or at the centering appendix 7, and by corresponding shaping and/or choice of material also directly forms the spring elements for the necessary prestressing of the annular plates 10 against the valve seat 2.

Figure 9:
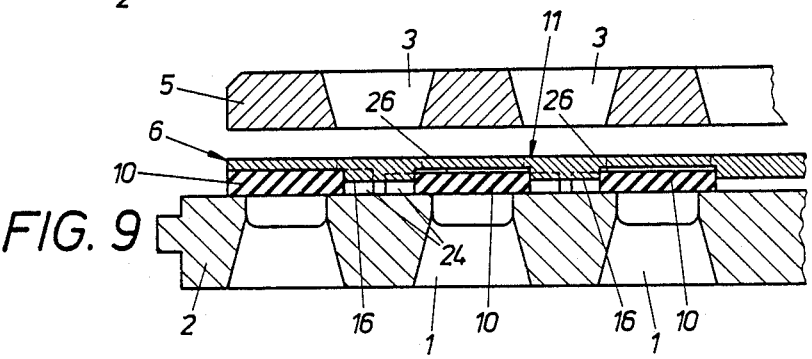
FIG. 9 is a further embodiment shown in cross-sectional view again substantially corresponding to FIG. 1.
Figure 10:
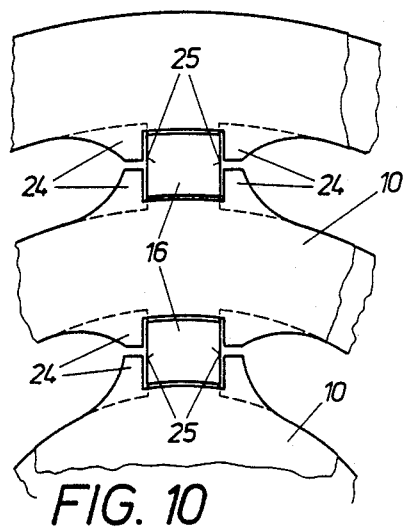
FIG. 10 is a view of the valve plate in accordance with FIG. 9 from below.
Figure 11:
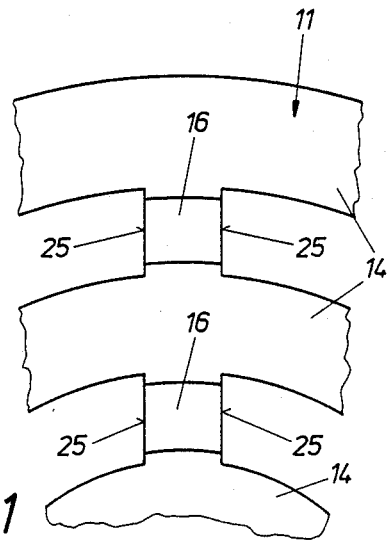
FIG. 11 is a view of the support plate in accordance with FIG. 9 again from below.
Figure 12:
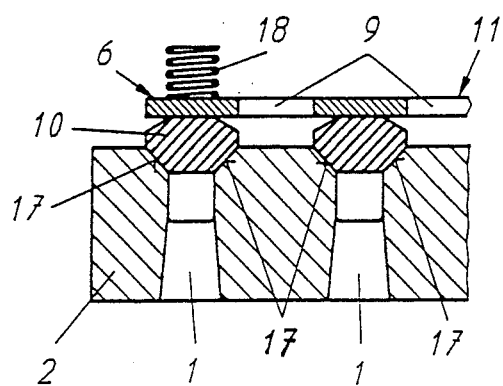

In the embodiment shown in FIGS. 9 to 11 the annular plates 10 are protected against rotating relative to the support plate 11, for which purpose radial projections 24 are provided on the annular plates 10 and engage in likewise radially directed guide surfaces 25 on the support plate 11. These guide surfaces 25 are in this case simply formed directly on the side of the centering projections 16 of the support plate 11, which for example arise as described with reference to FIG. 5.

FIG. 9 shows a further modification of the invention which is independent of the protection against rotation and can also be implemented without this. The two inner annular plates 10 are in this case made thinner than the outer annular plate 10 shown on the left, so that when the valve is closed as shown in FIG. 9, a narrow gap 26 remains between the inner annular plates 10 and the support plate 11. The two inner annular plates 10 are then not loaded by the support plate 11 and on opening the valve they lift earlier from the valve seat 2 than the outer annular plate 10. The same effect can be obtained if for annular plates 10 of constant thickness the bearing surfaces for them on the support plate 11 are provided at a different distance from the sealing surface of the valve seat 2.

Circularly extending passage channels 1 are again arranged concentric with each other in the valve seat 2 in the embodiments shown in FIGS. 12 to 15. The valve axis, the right hand half of the valve and the valve guard are not shown. The passage channels 1 are controlled by the valve plate 6, which is formed from the individual annular plates 10 and the support plate 11 jointly associated with these. The passage channels 1 are provided with funnel-shaped enlargements at that end facing the valve plate 6 to form sealing seats 17 which cooperate with the annular plates 10. The annular plates 10 are tapered on their underside and project into the funnel-shaped enlargements, where by way of their sides they cooperate with the sealing seats 17.

The lift of the annular plates 10 which arises on operating the valve is smaller than the height of the tapered parts of the annular plates 10 by which these project into the funnel-shaped enlargements. The annular plates 10 are thus guided radially during the lifting movement; they are unable to escape from the funnel-shaped enlargements. The support plate 11 provides uniform distribution of the spring forces exerted by the helical springs 18 over the annular plates 10, even if the support plate 11 is loaded by only a few helical springs 18 acting only on the most outer ring of the support plate 11. In place of the helical springs 18 resilient plates can be provided or the springing can be effected by resilient arms bent outwards from the support plate 11.

Figure 13:
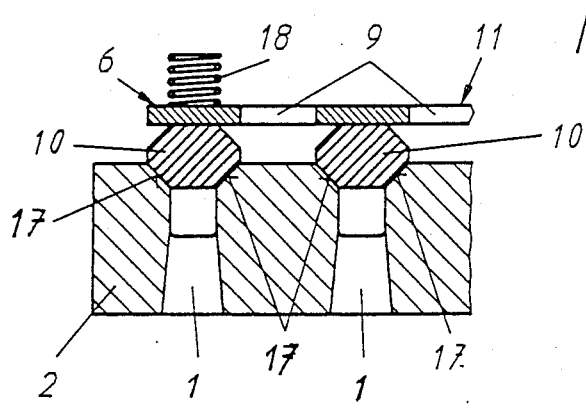
Figure 14:
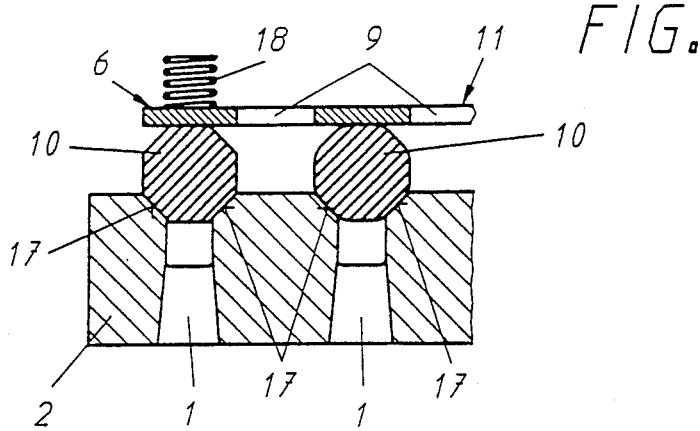
Figure 15:
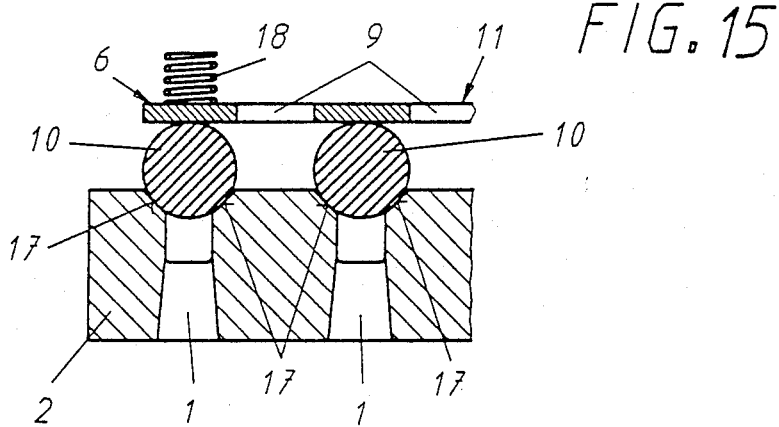

In FIGS. 12 to 15 the annular plates 10 associated with the joint support plate 11 are each tapered both on the side facing the valve seat 2 and on the side facing away from the valve seat 2. In the embodiment shown in FIG. 12 the annular plates 10 are less steeply inclined on that side lying on the support plate 11 than on the side facing the valve seat 2, where their sides cooperate with the sealing seats 17. In FIG. 13 the annular plates 10 are in contrast formed with an equal profile on both sides. This has the additional advantage that the annular plates 10 can also be inserted in the reverse position in the valve as both sides match the sealing seats 17 in the valve seat 2. The cross-sectional profile of the annular plates 10 is shown tapered on the upper and lower sides in FIG. 13. It can however also be of another shape, in particular polygonal, circular arc, elliptical or in any other manner convex, if need be with cylindrically extending flanks. In FIG. 14 the annular plates 10 are shown with eight sides, the profile of the annular plate 10 shown on the left side having rounded edges. The annular plates 10 in the embodiment of FIG. 15 are of torus shape, ie with an annular shape cross-sectional profile.

By means of the illustrated and described shaping of the annular plates 10, on the other hand reliable guiding and trouble-free sealing of the sealing seats 17 in the valve seat 2 is obtained and on the other hand the bearing surfaces on the support plate 11 are reduced. Medium which flows back to the passage channels 1 through the openings 9 in the support plate 11 can thus strike the tapered surfaces on the upper side of the annular plate 10 and effect rapid closure of the valve. If the annular plates have the same shape on their upper and lower sides as shown in FIGS. 13 to 15, they can be turned over when wear appears, so increasing their life. The annular plates of simple profile can be produced at low cost. The support plate is likewise simple to construct as no securing or guide means are required for the annular plates 10.

What is claimed is:

1. A ring valve, particularly for compressors, comprising a valve seat with passage channels disposed in ring formation for the controlled medium, a valve guard comprising outlet passages and arranged above the valve seat to leave an interspace therebetween, and a valve plate disposed in this interspace and urged against the valve seat by spring elements supported on the valve guard, characterised in that the valve plate consists of individual annular plates, each annular plate being disposed over each of the passage channels of the valve seat, and a support plate which lies jointly or all the annular plates on that side thereof facing away from the valve seat and transfers the force of the spring elements which act on it.

2. A ring valve as claimed in claim 1, wherein the support plate is centered in the valve and is guided during its lifting movement.

3. A ring valve as claimed in the claim 1, wherein the support plate is locked in position in relation to the valve seat and valve guard in an axial direction in the region of the valve axis, and the spring elements are formed by profiling the support plate.

4. A ring valve as claimed in claim 3, wherein the support plate is secured to the individual annular plates so that these are immovable in a radial direction.

5. A ring valve as claimed in claim 4, wherein the support plate is provided with centering projections, which lie at least against one edge of the annular plates.

6. A ring valve as claimed in claim 5, wherein the support plate is at least partially provided with groove-shaped depressions into which the annular plates are inserted.

7. A ring valve as claimed in claim 6, wherein the annular plates are fixed relative to the support plate by means of radial projections or the like, which engage with radially directed guide surfaces on the support plate.

8. A ring valve as claimed in claim 1, wherein the support plate lies tightly against the annular plates at least in the region of the edges of these latter, the annular plates comprising perforations within the region.

9. A ring valve as claimed in claim 8, wherein the support plate is provided with sealing strips which lie against the annular plates.

10. A ring valve as claimed in claim 9, wherein the annular plates are at least partially of plastics material.

11. A ring valve as claimed in claim 10, wherein when the valve is closed the support plate lies against the most outer annular plate, a free intermediate gap being provided between the remaining annular plates and the support plate.

12. A ring valve as claimed in claim 11, wherein the annular plates associated with the support plate are bevelled both on the sides facing the valve seat and on the sides facing away from the valve seat, and engage in matching funnel-shaped enlargements in the valve seat.

13. A ring valve as claimed in claim 12, wherein the annular plates have the same profile on both sides.

14. A ring valve as claimed in claim 12, wherein the annular plates are formed with a polygonal cross-section.

15. A ring valve as claimed in claim 14, wherein the edges of the polygonal cross-section are rounded.

16. A ring valve as claimed in claim 12, wherein the annular plates are of torus shape.

17. A ring valve as claimed in claim 13, characterised in that the annular plates are formed with a polygonal cross-section.

18. A ring valve as claimed in claim 13, characterised in that the annular plates are of torus shape.

* * * * *